(12) United States Patent
Laurello et al.

(10) Patent No.: US 8,584,469 B2
(45) Date of Patent: Nov. 19, 2013

(54) COOLING FLUID PRE-SWIRL ASSEMBLY FOR A GAS TURBINE ENGINE

(75) Inventors: Vincent P. Laurello, Hobe Sound, FL (US); Keith D. Kimmel, Jupiter, FL (US); Todd Ebert, West Palm Beach, FL (US)

(73) Assignee: Siemens Energy, Inc., Orlando, FL (US)

( * ) Notice: Subject to any disclaimer, the term of this patent is extended or adjusted under 35 U.S.C. 154(b) by 891 days.

(21) Appl. No.: 12/758,065

(22) Filed: Apr. 12, 2010

(65) Prior Publication Data

US 2011/0247345 A1    Oct. 13, 2011

(51) Int. Cl.
F02C 7/18    (2006.01)

(52) U.S. Cl.
USPC ............... 60/806; 415/115; 415/121.2

(58) Field of Classification Search
USPC .......... 60/782, 784, 785, 805, 806, 39.092; 415/115, 121.1, 121.2
See application file for complete search history.

(56) References Cited

U.S. PATENT DOCUMENTS

| | | | |
|---|---|---|---|
| 3,356,340 A * | 12/1967 | Bobo ........................... | 415/115 |
| 3,768,921 A | 10/1973 | Brown et al. | |
| 3,832,090 A * | 8/1974 | Matto ........................... | 415/115 |
| 3,918,835 A * | 11/1975 | Yamarik et al. ................ | 416/95 |
| 3,936,215 A | 2/1976 | Hoff | |
| 3,993,463 A | 11/1976 | Barr | |
| 4,113,406 A | 9/1978 | Lee et al. | |
| 4,456,427 A * | 6/1984 | Evans et al. .................... | 60/806 |
| 4,541,774 A | 9/1985 | Rieck et al. | |
| 4,674,955 A * | 6/1987 | Howe et al. .................... | 415/115 |
| 4,685,942 A | 8/1987 | Klassen et al. | |
| 4,720,235 A | 1/1988 | Lachance et al. | |
| 4,815,272 A | 3/1989 | Laurello | |
| 4,822,244 A | 4/1989 | Maier et al. | |
| 4,928,480 A | 5/1990 | Oliver et al. | |
| 5,245,821 A * | 9/1993 | Thomas et al. ................ | 60/806 |
| 5,402,636 A * | 4/1995 | Mize et al. .................... | 60/806 |
| 5,498,273 A | 3/1996 | Mann | |
| 5,857,833 A | 1/1999 | Dev | |
| 6,050,079 A * | 4/2000 | Durgin et al. .................. | 60/782 |
| 6,134,874 A | 10/2000 | Stoten | |

(Continued)

OTHER PUBLICATIONS

Geis et al "Endoscopic PIV-Measurements in an Enclosed Rotor-Stator System with Pre-Swirled Cooling Air." pp. 1-11, presented at the 11th International Symposium on the Application of Laser Techniques to Flow Measurement (Gulbenkian Foundation, Lisbon, Portugal, Jul. 8-11, 2002).*

(Continued)

Primary Examiner — Ted Kim

(57) ABSTRACT

A gas turbine engine includes a pre-swirl structure. Inner and outer wall structures of the pre-swirl structure define a flow passage in which swirl members are located. The swirl members include a leading edge and a circumferentially offset trailing edge. Cooling fluid exits the flow passage with a velocity component in a direction tangential to the circumferential direction, wherein a swirl ratio defined as the velocity component in the direction tangential to the circumferential direction of the cooling fluid to a velocity component of a rotating shaft in the direction tangential to the circumferential direction is greater than one as the cooling fluid exits the flow passage outlet, and the swirl ratio is about one as the cooling fluid enters at least one bore formed in a blade disc structure. An annular cavity extends between the flow passage and the at least one bore formed in the blade disc structure.

20 Claims, 4 Drawing Sheets

(56) References Cited

U.S. PATENT DOCUMENTS

| | | |
|---|---|---|
| 6,343,792 B1 | 2/2002 | Shinohara et al. |
| 6,397,604 B2 | 6/2002 | Eldrid et al. |
| 6,413,044 B1 * | 7/2002 | Roeloffs et al. ............ 415/169.1 |
| 6,499,285 B1 | 12/2002 | Snyder |
| 6,595,741 B2 | 7/2003 | Briesenick et al. |
| 6,698,180 B2 | 3/2004 | Snyder |
| 6,773,225 B2 | 8/2004 | Yuri et al. |
| 6,837,676 B2 | 1/2005 | Yuri et al. |
| 6,969,237 B2 | 11/2005 | Hudson |
| 7,121,791 B2 | 10/2006 | Friedl et al. |
| 7,137,777 B2 * | 11/2006 | Fried et al. ................ 415/121.2 |
| 7,189,056 B2 | 3/2007 | Girgis et al. |
| 7,374,593 B2 | 5/2008 | Snyder |
| 7,445,424 B1 * | 11/2008 | Ebert et al. .................... 415/113 |
| 7,914,253 B2 * | 3/2011 | Vedhagiri et al. .............. 415/115 |
| 2007/0003407 A1 * | 1/2007 | Turner et al. .................. 415/115 |
| 2007/0110565 A1 * | 5/2007 | Montgomery et al. ....... 415/115 |
| 2008/0112793 A1 * | 5/2008 | Lee et al. ...................... 415/115 |
| 2008/0310950 A1 * | 12/2008 | Young et al. .................. 415/116 |
| 2008/0310951 A1 * | 12/2008 | Bremer ...................... 415/121.2 |
| 2010/0275612 A1 * | 11/2010 | Smoke et al. ................... 60/785 |

OTHER PUBLICATIONS

Keith D Kimmel et al.; U.S. patent application entitled "Cooling Fluid Metering Structure in a Gas Turbine Engine", 31 pages.

Todd Ebert et al; U.S. patent application entitled "Particle Separator in a Gas Turbine Engine", 32 pages.

* cited by examiner

COOLING FLUID PRE-SWIRL ASSEMBLY FOR A GAS TURBINE ENGINE

CROSS REFERENCE TO RELATED APPLICATIONS

This application is related to U.S. patent application Ser. No. 12/758,069, entitled "COOLING FLUID METERING STRUCTURE IN A GAS TURBINE ENGINE" by Keith D. Kimmel et al., and U.S. patent application Ser. No. 12/758,071, entitled "PARTICLE SEPARATOR IN A GAS TURBINE ENGINE" by Todd Ebert et al., the entire disclosures of each of which are incorporated by reference herein.

FIELD OF THE INVENTION

The present invention relates to a gas turbine engine, and more particularly, to a gas turbine engine including a cooling fluid pre-swirl assembly that swirls cooling fluid used to cool turbine blade structure in a turbine section of the gas turbine engine.

BACKGROUND OF THE INVENTION

In gas turbine engines, compressed air discharged from a compressor section and fuel introduced from a source of fuel are mixed together and burned in a combustion section, creating combustion products defining hot working gases. The working gases are directed through a hot gas path in a turbine section, where they expand to provide rotation of a turbine rotor. The turbine rotor may be linked to an electric generator, wherein the rotation of the turbine rotor can be used to produce electricity in the generator.

In view of high pressure ratios and high engine firing temperatures implemented in modern engines, certain components, such as rotating blade structures within the turbine section, must be cooled with cooling fluid, such as compressor discharge air, to prevent overheating of the components. The cooling fluid can be contaminated with various types of particles, which can cause blockage of turbine blade cooling holes or other structure in the turbine section that is cooled with the cooling fluid, which can shorten the life of these components.

SUMMARY OF THE INVENTION

In accordance with a first aspect of the present invention, a gas turbine engine is provided. The gas turbine engine comprises a supply of cooling fluid, a rotatable shaft, shaft cover structure, blade disc structure coupled to the shaft having at least one bore for receiving cooling fluid, and a pre-swirl structure disposed about the shaft. The pre-swirl structure comprises radially inner wall structure, radially outer wall structure spaced from the inner wall structure, and a plurality of swirl members. The inner and outer wall structures extend about the shaft and are each coupled to the shaft cover structure. The inner and outer wall structures define a flow passage therebetween that includes an inlet and an outlet and that receives fluid from the supply of cooling fluid. The swirl members extend in the flow passage between the inner and outer wall structures. Each of the swirl members includes a leading edge at the flow passage inlet and a trailing edge at the flow passage outlet, wherein the trailing edge is offset from the leading edge in the circumferential direction. The supply of cooling fluid supplies cooling fluid to the pre-swirl structure such that the cooling fluid exiting the flow passage outlet has a velocity component in a direction tangential to the circumferential direction, wherein a swirl ratio defined as the velocity component in the direction tangential to the circumferential direction of the cooling fluid to a velocity component of the shaft in the direction tangential to the circumferential direction is greater than one as the cooling fluid exits the flow passage outlet, and the swirl ratio is about one as the cooling fluid enters the at least one bore formed in the blade disc structure. An annular cavity extends between the flow passage outlet and the at least one bore formed in the blade disc structure.

The swirl ratio may be between about 1.15 and about 1.25 when the cooling fluid exits the pre-swirl structure.

The gas turbine engine may further comprise a particle separator that includes particle deflecting structure located downstream from the pre-swirl structure. The particle deflecting structure is coupled to and extends radially inwardly from the blade disc structure. The particle separator separates solid particles from the cooling fluid after the cooling fluid exits the pre-swirl structure.

The particle separator may further comprise a particle collection chamber upstream from the particle deflecting structure. The particle collection chamber receives the solid particles separated from the cooling fluid.

The pre-swirl structure may remain stationary with the shaft cover structure such that it does not rotate with the shaft during operation of the gas turbine engine, and the particle deflecting structure may rotate with the shaft during operation of the gas turbine engine.

The annular cavity may be substantially defined by the blade disc structure, the pre-swirl structure, and the particle deflecting structure.

The gas turbine engine may further comprise sealing structure located axially between the flow passage outlet and the at least one bore formed in said blade disc structure. The sealing structure limits leakage between the annular cavity and a turbine rim cavity located radially outwardly from said annular cavity.

The swirl members may be configured such that the cooling fluid exiting the flow passage flows at an angle of from about 65° to about 85° relative to a central axis of the gas turbine engine.

The swirl members may be arranged such that spacing between a first sidewall at the trailing edge of each swirl member and a second sidewall of an adjacent swirl member causes a Venturi effect as the cooling fluid flows through the flow passage, the Venturi effect resulting in a pressure drop and a velocity increase of the cooling fluid flowing through the flow passage.

The Venturi effect may be effected by converging sidewalls of adjacent swirl members.

In accordance with a second aspect of the present invention, a gas turbine engine is provided. The gas turbine engine comprises a supply of cooling fluid, a rotatable shaft, a non-rotatable shaft cover structure disposed about the shaft, blade disc structure having at least one bore for receiving cooling fluid, and a pre-swirl structure disposed about the shaft. The pre-swirl structure comprises radially inner wall structure coupled to the shaft cover structure and extending circumferentially about the shaft; radially outer wall structure spaced from the inner wall structure, the outer wall structure coupled to the shaft cover structure and extending circumferentially about the shaft, the inner and outer wall structures defining a flow passage therebetween, the flow passage including an inlet and an outlet and receiving fluid from the supply of cooling fluid; a plurality of swirl members extending in the flow passage between the inner and outer wall structures; and sealing structure located axially between the flow passage outlet and the at least one bore formed in the blade disc structure, the sealing structure limiting leakage between the annular cavity and a turbine rim cavity located radially outwardly from the annular cavity. The swirl members each include a leading edge at the flow passage inlet and a trailing edge at the flow passage outlet and offset from the leading edge in the circumferential direction. The supply of cooling fluid supplies a first portion of cooling fluid to the pre-swirl structure such that the first portion of cooling fluid exiting the flow passage outlet has a velocity component in a direction tangential to the circumferential direction, wherein a swirl ratio defined as the velocity component in the direction tangential to the circumferential direction of the first portion of cooling fluid to a velocity component of the shaft in the direction tangential to the circumferential direction is greater than one as the first portion of cooling fluid exits the flow passage outlet. An annular cavity extends between the flow passage outlet and the at least one bore formed in the blade disc structure coupled to the shaft. An axial flow distance of the first portion of cooling fluid within the annular cavity is greater than about 50 mm.

The gas turbine engine may further comprise at least one bypass passage associated with the shaft cover structure, the at least one bypass passage in fluid communication with the supply of cooling fluid for supplying a second portion of cooling fluid from the supply of cooling fluid to the turbine rim cavity.

The second portion of cooling fluid flowing from the supply of cooling fluid to the turbine rim cavity may not interact with the first portion of cooling fluid.

A pressure within the annular cavity may be greater than a pressure within the turbine rim cavity and may also be greater than a pressure within a cavity located between the shaft and the shaft cover structure.

The gas turbine engine may further comprise a metering structure associated with an outlet of each bypass passage, the metering structure comprising at least one flow passageway formed therein for permitting the second portion of cooling fluid in each bypass passage to pass into the turbine rim cavity.

Each flow passageway may be formed in the metering structure at an angle such that the second portion of cooling fluid flowing out of each flow passageway has a velocity component in the direction tangential to the circumferential direction.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
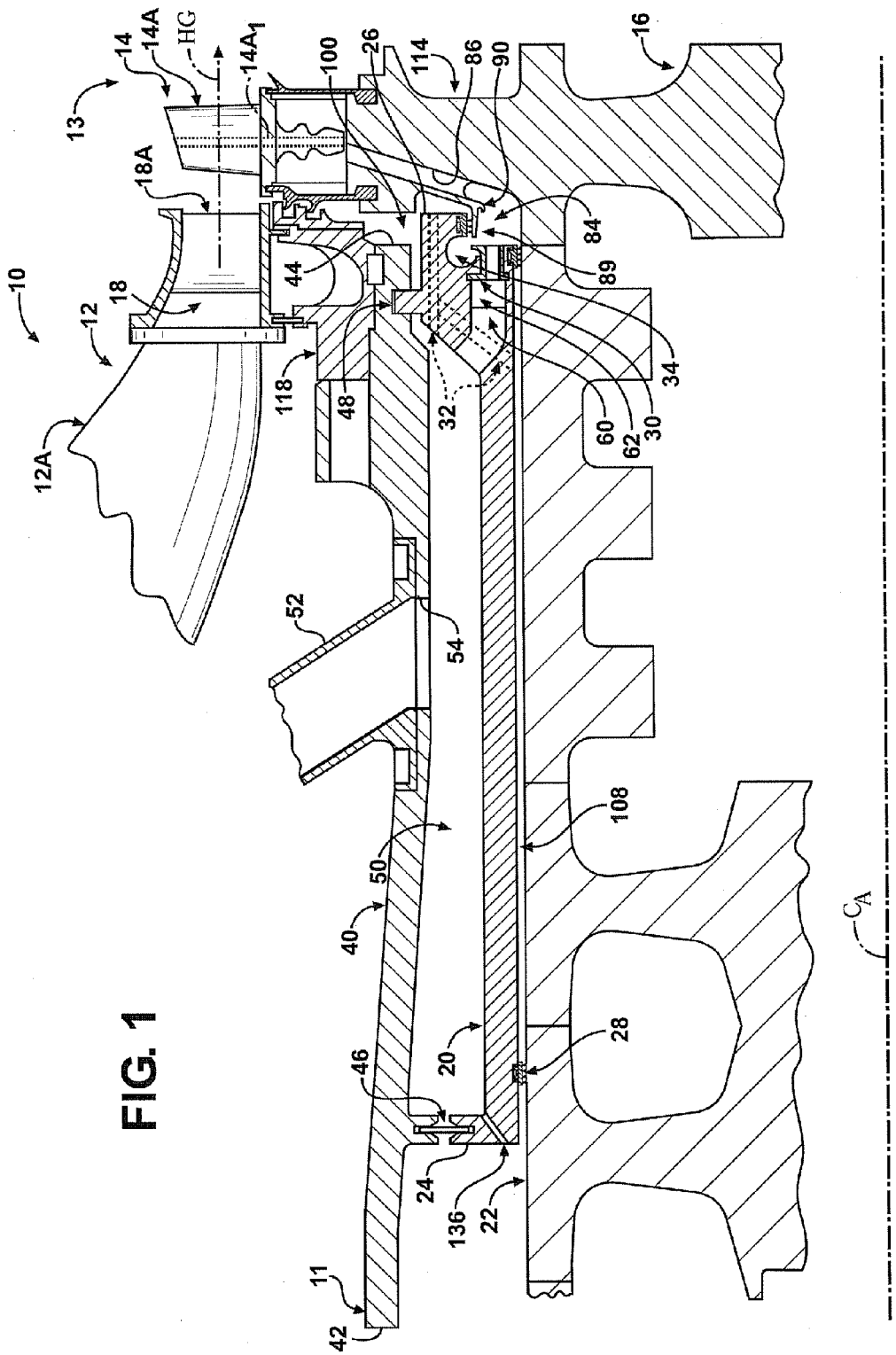
FIG. 1 is a sectional view of a portion of a gas turbine engine according to an embodiment of the invention.

Referring now to FIG. 1, a portion of a gas turbine engine 10 according to an embodiment of the invention is shown. The engine 10 includes a conventional compressor section 11 for compressing air. The compressed air from the compressor section 11 is conveyed to a combustion section 12, which produces hot combustion gases by burning fuel in the presence of the compressed air from the compressor section 11. The combustion gases are conveyed through a plurality of transition ducts 12A to a turbine section 13 of the engine 10. The turbine section 13 comprises alternating rows of rotating blades 14 and stationary vanes 18. A first row 14A of circumferentially spaced apart blades 14 coupled to a first blade disc structure 114 and a first row 18A of circumferentially spaced apart vanes 18 coupled to an interior side of a main engine casing (not shown) and a first lower stator support structure 118 are illustrated in FIG. 1. A plurality of the blade disc structures, including the first blade disc structure 114, are positioned adjacent to one another in an axial direction so as to define a rotor 16. Each of the blade disc structures supports a plurality of circumferentially spaced apart blades and each of a plurality of lower stator support structures support a plurality of circumferentially spaced apart vanes. The vanes 18 direct the combustion gases from the transition ducts 12A along a hot gas flow path HG onto the blades 14 such that the combustion gases cause rotation of the blades 14, which in turn causes corresponding rotation of the rotor 16.

As shown in FIG. 1, a shaft cover structure 20 surrounds a portion of a shaft 22, which shaft 22 is coupled to the rotor 16 for rotation with the rotor 16. It is noted that the shaft cover structure 20 may be mounted to the main engine casing and does not rotate with the shaft 22 and the rotor 16 during operation of the engine 10. In an embodiment, the shaft cover structure 20 may comprise two halves or sections that are joined together about the shaft 22, such as, for example, by bolting, although it is understood that the shaft cover structure 20 may be formed from additional or fewer pieces/sections. The shaft cover structure 20 comprises a generally cylindrical member having a forward end portion 24 and an opposed aft end portion 26.

Referring still to FIG. 1, the forward end portion 24 of the shaft cover structure 20 includes a shaft seal assembly 28 that creates a substantially fluid tight seal with the shaft 22. The shaft seal assembly 28 may comprise, for example, a rotating structure, such as a knife edge seal, coupled to the shaft 22, which may be in combination with a non-rotating seal structure, such as a honeycomb seal or an abradable material coupled to the forward end portion 24 of the shaft cover structure 20. Other suitable exemplary types of shaft seal assemblies 28 include leaf seals, brush seals, and non-contacting fin seals.

The aft end portion 26 of the shaft cover structure 20 comprises a pre-swirl structure 30 and defines a plurality of bypass passages 32 and a particle collection chamber 34, each of which will be described in detail herein.

An outer cover 40 is disposed radially outwardly from the shaft cover structure 20. The outer cover 40 includes a forward end portion 42 upstream and radially outward from the forward end portion 24 of the shaft cover structure 20 and an aft end portion 44 radially outward from the aft end portion 26 of the shaft cover structure 20. First seal structure 46, such as, for example, a dog bone seal or diaphragm seal is disposed between the forward end portion 24 of the shaft cover structure 20 and the outer cover 40 for creating a substantially fluid tight seal therebetween. Second seal structure 48 is located between the shaft cover structure 20 and the outer cover 40 adjacent to the respective aft end portions 26, 44 thereof. The second seal structure 48 creates a substantially fluid tight seal between the aft end portion 26 of the shaft cover structure 20 and the aft end portion 44 of the outer cover 40. In the embodiment shown, the second seal structure 48 also provides a structural support for the shaft cover structure 20 via the outer cover 40. It is noted that the outer cover 40 is non-rotatable and is structurally supported within the engine 10 by the main engine casing via a plurality of struts (not shown).

A cooling fluid chamber 50 is located radially between the shaft cover structure 20 and the outer cover 40 and axially between the first and second seal structures 46, 48. The cooling fluid chamber 50 receives cooling fluid from a supply of cooling fluid, e.g., compressor bleed air that is cooled in an external cooler (not shown), from a plurality of cooling fluid feed tubes 52 (one shown in FIG. 1). The cooling fluid feed tubes 52 deliver the cooling fluid into the cooling fluid chamber 50 through one or more respective apertures 54 formed in the outer cover 40. The cooling fluid, which may have a temperature of, for example, between about 250-350° F., is used to cool the shaft cover structure 20, the shaft 22, and structure in the turbine section 13 of the engine 10, as will be described in greater detail herein.

Figure 2:
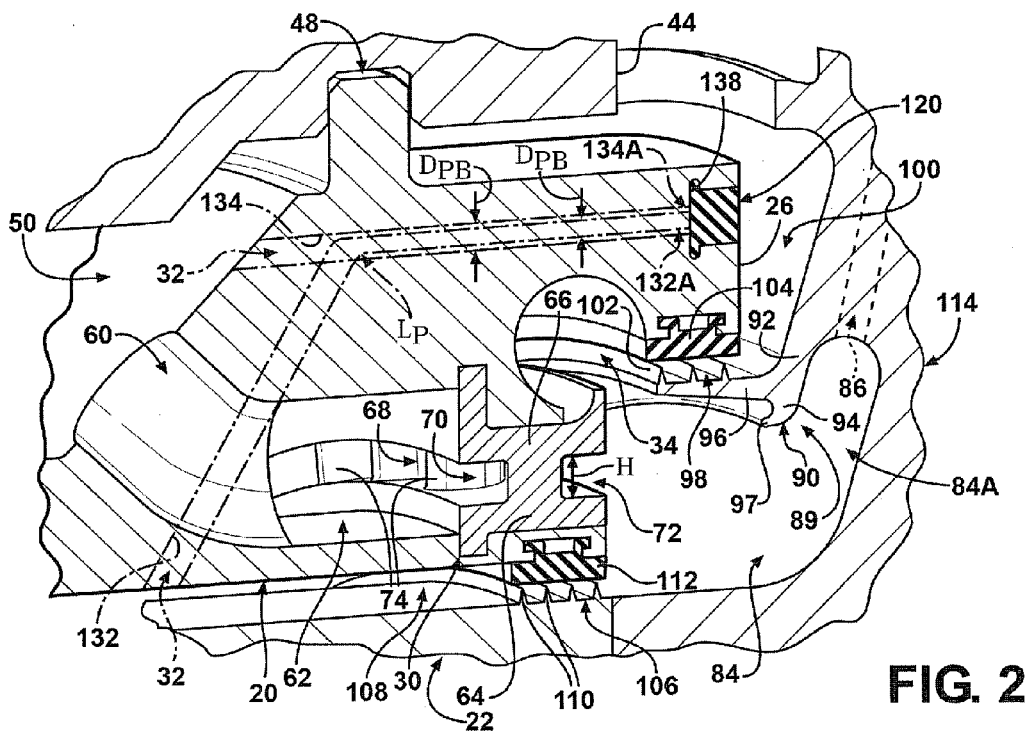
FIG. 2 is a perspective view partially in section of a portion of the gas turbine engine illustrated in FIG. 1.
Figure 3:
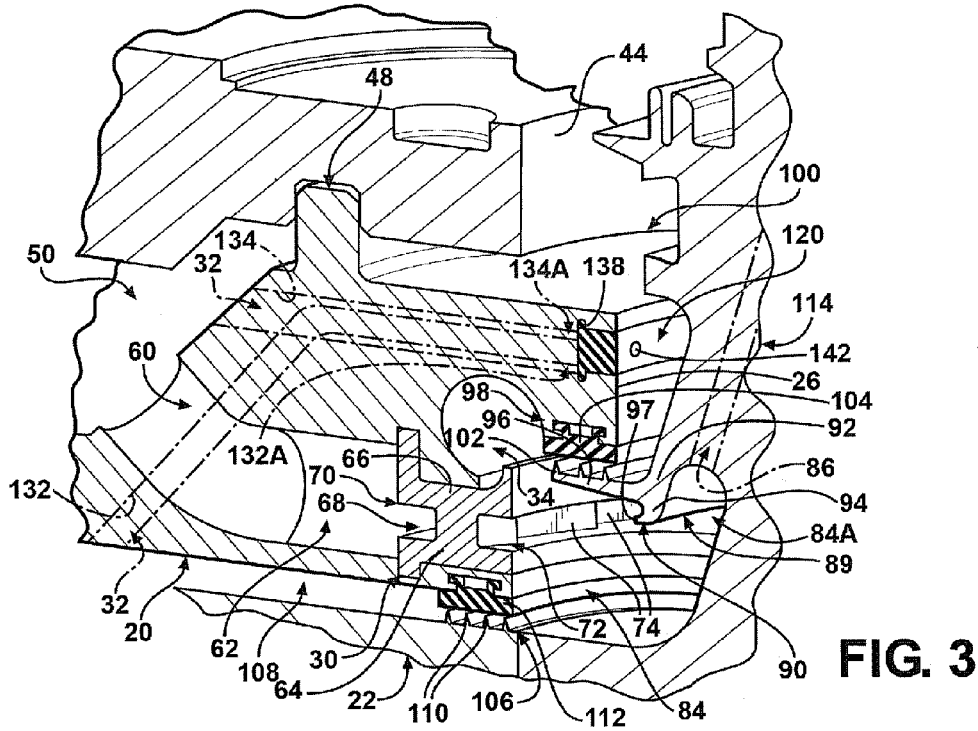
FIG. 3 is a perspective view partially in section of the portion of the gas turbine engine illustrated in FIG. 2 taken from a different angle.

Referring additionally to FIGS. 2 and 3, a first portion of cooling fluid supplied by the cooling fluid chamber 50 flows through a series of pre-swirl passages 60 (one shown in FIGS. 1-3) that extend through the shaft cover structure aft end portion 26 from the cooling fluid chamber 50 to an annular pre-swirl chamber 62. The first portion of cooling fluid flows from the pre-swirl passages 60 into the pre-swirl chamber 62 and is provided to the pre-swirl structure 30.

As shown in FIGS. 2 and 3, the pre-swirl structure 30 includes a radially inner wall structure 64 that extends about the shaft 22 and is fixedly coupled to the shaft cover structure 20. The pre-swirl structure 30 also includes a radially outer wall structure 66 radially spaced from the inner wall structure 64. The outer wall structure 66 extends about the shaft 22 and is also fixedly coupled to the shaft cover structure 20. The inner and outer wall structures 64, 66 define an annular flow passage 68 therebetween, which flow passage 68 includes an inlet 70 and an outlet 72 (see also FIG. 4), through which the first portion of cooling fluid passes after entering the pre-swirl structure 30 from the pre-swirl chamber 62.

Figure 4:
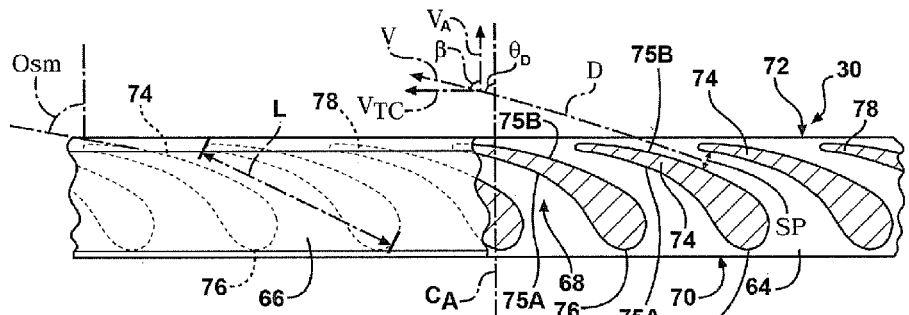
FIG. 4 is a cross sectional view illustrating a plurality of swirl members according to an embodiment of the invention.

A plurality of swirl members 74 extend in the flow passage 68 and span between the inner and outer wall structures 64, 66. As more clearly shown in FIG. 4, the swirl members 74 each include opposed first and second sidewalls 75A, 75B, a leading edge 76 at the flow passage inlet 70 and a trailing edge 78 at the flow passage outlet 72. The leading edge 76 of each of the swirl members 74 is offset from the trailing edge 78 in the circumferential direction, as shown in FIG. 4. Thus, the first portion of cooling fluid flowing through the flow passage 68 is caused to change direction by the swirl members 74, such that the first portion of cooling fluid exiting the flow passage outlet 72 has a velocity vector V (see FIG. 4) with a velocity component $V_{TC}$ in a direction tangent to a circumferential direction, wherein the circumferential direction is defined by a first circumferential surface of the inner wall structure 64, and an axial velocity component $V_A$ as it flows downstream toward the turbine section 13 of the engine 10, as will be described in detail herein. An angle β between the velocity vector V and its velocity component $V_A$ may be between about 65° and about 85°. A radial height H (see FIG. 2) of each of the swirl members 74 according to an exemplary embodiment of the invention may be about 15-25 mm and a chordal length L (see FIG. 4) of each of the swirl members 74 according to an exemplary embodiment of the invention may be about 60-105 mm according to one embodiment of the invention.

Referring to FIG. 4, in a preferred embodiment, the swirl members 74 are configured such that the cooling fluid exiting the flow passage outlet 72 flows or moves in a direction D at an angle $\theta_D$ of from about 65° to about 85° relative to a central axis $C_A$ (see FIGS. 1 and 4) of the engine 10. Such a flow direction D of the cooling fluid can be effected by forming the trailing edges 78 of the swirl members 74 so that they extend at an angle $\theta_{SM}$ of from about 65° to about 85° relative to the central axis $C_A$ of the engine 10.

Further, the swirl members 74 in the preferred embodiment are circumferentially spaced from one another so as to allow a desired amount of cooling fluid through the flow passage 68 to adequately cool the structure to be cooled in the turbine section 13 of the engine 10. As shown in FIG. 4, the narrowest spacing $S_P$ between the trailing edge 78 of one swirl member 74 and an adjacent swirl member 74, which spacing $S_P$ may also be referred to as the throat section between the swirl members 74, is also preferably configured to obtain a desired pressure drop, i.e., caused by a Venturi effect effected by the converging sidewalls 75A and 75B of the swirl members 74, and to cause a corresponding velocity increase as the cooling fluid flows through the flow passage 68. According to one embodiment, the narrowest spacing Sp between the first sidewall 75A at the trailing edge 78 of one swirl member 74 and the second sidewall 75B of the adjacent swirl member 74 may be about 10 mm, but may vary depending upon the particular configuration of the engine 10. It is noted that the velocity component $V_{TC}$ of the cooling fluid exiting the flow passage outlet 72 in the direction tangent to the circumferential direction is preferably greater than a velocity component of the shaft 22 and the rotor 16 in the direction tangent to the circumferential direction during operation of the engine 10, as will be discussed in greater detail herein.

Since the pre-swirl structure 30 is located close to the shaft 22, a leakage interface area between the pre-swirl structure 30 and the shaft cover structure 20 is reduced, as compared to if the pre-swirl structure 30 were to be located further radially outwardly. Specifically, the leakage interface area between the pre-swirl structure 30 and the shaft cover structure 20 is defined as the area between where the radially inner wall structure 64 and the shaft cover structure 20 meet, in addition to the area between where the radially outer wall structure 66 and the shaft cover structure 20 come together. Since these areas are located generally close to the shaft 22, their circumferences are relatively small (as compared to if these areas were located radially outwardly further from the shaft 22), such that the leakage areas are relatively small. This is compared to a configuration where the leakage areas are radially outwardly further from the shaft 22, in which case the circumferences of the leakage interface areas would be larger.

This same concept applies for leakage through first and second sealing structure 98 and 106, each of which will be discussed below.

An annular cavity 84 is located downstream from the pre-swirl structure 30 and extends from the flow passage outlet 72 to a plurality of bores 86 formed in the first blade disc structure 114. As illustrated in FIGS. 1-3, the annular cavity is substantially defined by the first blade disc structure 114, the pre-swirl structure 30, and a particle deflecting structure 90, which particle deflecting structure 90 will be described in detail herein. The bores 86 in the first blade disc structure 114 extend radially outwardly and axially downstream through the first blade disc structure 114 to the first row 14A of blades 14 to provide the first portion of cooling fluid to internal cooling circuits $14A_1$ formed in the blades 14, see FIG. 1.

Referring back to FIGS. 2 and 3, a particle separator 89 according to an aspect of the present invention comprises the particle deflecting structure 90 and the particle collection chamber 34, which, as noted above, is defined by a portion of the shaft cover structure 20. The particle deflecting structure 90 is located in the annular cavity 84 downstream from the pre-swirl structure 30 and upstream from the bores 86 in the first blade disc structure 114. The particle deflecting structure 90 is coupled to and extends radially inwardly from a seal arm 92 of the first blade disc structure 114, and, thus, rotates with the first blade disc structure 114 and the rotor 16 during operation of the engine 10.

The particle deflecting structure 90 includes a radially inwardly extending portion 94 that extends radially inwardly from the seal arm 92 of the first blade disc structure 114 and a generally axially extending portion 96. The radially inwardly extending portion 94 includes a radially inner end portion 97, which end portion 97 is curved in the radial direction such that it extends in the axial direction at its end toward the pre-swirl structure 30 and the particle collection chamber 34. The end portion 97 is located further radially inwardly than the axially extending portion 96, which axially extending portion 96 extends generally axially from the radially extending portion 94 toward the pre-swirl structure 30 and the particle collection chamber 34. However, as most clearly seen in FIG. 6, the axially extending portion 96 is slightly sloped in the radial direction as it extends toward the pre-swirl structure 30 and the particle collection chamber 34, i.e., the axially extending portion 96 is sloped such that it expands circumferentially in a direction toward the particle collection chamber 34. As will be described in detail herein, the particle deflecting structure 90 deflects solid particles from the first portion of cooling fluid into the particle collection chamber 34 after the first portion of cooling fluid exits the pre-swirl structure 30.

Referring to FIGS. 2 and 3, the first sealing structure 98 is located radially outwardly from the annular cavity 84 between the shaft cover structure 20 and the axially extending portion 96 of the particle deflecting structure 90. The first sealing structure 98 is located axially between the flow passage outlet 72 and the bores 86 in the first blade disc structure 114. The first sealing structure 98 limits leakage between the annular cavity 84 and a turbine rim cavity 100, which turbine rim cavity 100 is defined by the first blade disc structure 114 and the first lower stator support structure 118 and is located proximate to the hot gas flow path HG. Additional details in connection with the turbine rim cavity 100 will be discussed in detail herein. The first sealing structure 98 may comprise, for example, one or more knife-edge seal members 102 extending radially outwardly from the axially extending portion 96 of the particle deflecting structure 90, and a honeycomb seal or abradable material 104 associated with the shaft cover structure 20. It is noted that other types of sealing structure may be used.

Also shown in FIGS. 2 and 3, the second sealing structure 106 is employed between the shaft cover structure 20 and the shaft 22 proximate to the aft end portion 26 of the shaft cover structure 20. The second sealing structure 106 limits leakage between the annular cavity 84 and a shaft cover cavity or chamber 108, which shaft cover cavity 108 will be discussed in detail herein. The second sealing structure 106 may comprise, for example, one or more knife-edge seal members 110 extending radially outwardly from the shaft 22, and a honeycomb seal or abradable material 112 associated with the shaft cover structure 20. It is noted that other types of sealing structure may be used.

Referring still to FIGS. 2 and 3, the shaft cover structure 20 at least partially defines the particle collection chamber 34, as noted above. The particle collection chamber 34 extends circumferentially about the shaft 22 and is in fluid communication with the annular cavity 84. The particle collection chamber 34 is located upstream of the particle deflecting structure 90 and at least partially radially outwardly from the annular cavity 84. As will be described in detail herein, the particle collection chamber 34 collects particles deflected from the first portion of cooling fluid by the particle deflecting structure 90. It is noted that some particles may flow directly into the particle collection chamber 34, i.e., without being deflected by the particle deflecting structure 90, as a result of the particles moving radially outwardly, as will be discussed herein.

Referring to FIGS. 1-3, the bypass passages 32 provide cooling fluid, including a second portion of cooling fluid from the cooling fluid chamber 50 to a metering structure 120, which metering structure 120 provides the second portion of cooling fluid from the bypass passages 32 into the turbine rim cavity 100.

The bypass passages 32 according to this aspect of the present invention comprise two types of passages. Specifically, a plurality of primary bypass passages 132, also referred to herein as a first set of bypass passages, provide cooling fluid located in the shaft cover cavity 108 to the metering structure 120, wherein at least a portion of the cooling fluid located in the shaft cover cavity 108 is from the cooling fluid chamber 50. Further, a plurality of secondary bypass passages 134, also referred to herein as a second set of bypass passages, provide cooling fluid located in the cooling fluid chamber 50 directly to the metering structure 120.

As noted above, at least a portion of the cooling fluid in the shaft cover cavity 108 that flows to the metering structure 120 through the primary bypass passages 132 comprises cooling fluid from the cooling fluid cavity 50. Specifically, cooling fluid flows from the cooling fluid cavity 50 through one or more cooling fluid ports 136 (see FIG. 1) formed in the forward end portion 24 of the shaft cover structure 20. A portion of this cooling fluid leaks through the shaft seal assembly 28 into the shaft cover cavity 108, and then flows to the metering structure 120 via the primary bypass passages 132.

Additional cooling fluid in the shaft cover cavity 108 may enter the shaft cover cavity 108 from the annular cavity 84 by leaking through the second sealing structure 106. It is noted that cooling fluid preferably does not leak from the shaft cover cavity 108 into the annular cavity 84, as the pressure of the cooling fluid in the annular cavity 84 is preferably as high as or higher than the pressure of the cooling fluid located within the shaft cover cavity 108.

The primary bypass passages 132 in the embodiment shown extend radially outwardly and axially downstream from where they communicate with the shaft cover cavity 108 to a location $L_P$ (see FIG. 2) and then extend generally axially downstream to the metering structure 120. The radially and axially extending sections of the primary bypass passages 132 do not communicate with the pre-swirl passages 60, such that the cooling fluid in the primary bypass passages 132 does not interact with the first portion of cooling fluid flowing through the pre-swirl passages 60 to the pre-swirl structure 30. This is accomplished in the embodiment shown by forming the primary bypass passages 132 through the shaft cover structure 20 at different circumferential locations than the pre-swirl passages 60.

The secondary bypass passages 134 extend generally axially downstream from the cooling fluid chamber 50 to the metering structure 120, as shown in FIGS. 2 and 3. The secondary bypass passages 134 do not communicate with the pre-swirl passages 60, such that the cooling fluid in the secondary bypass passages 134 does not interact with the first portion of cooling fluid flowing in the pre-swirl passages 60 to the pre-swirl structure 30. This is accomplished in the embodiment shown by forming the secondary bypass passages 134 through the shaft cover structure 20 at different circumferential locations than the pre-swirl passages 60. It is noted that the secondary bypass passages 134 are also formed through the shaft cover structure 20 at different circumferential locations than the primary bypass passages 132, such that the cooling fluid flowing in the secondary bypass passages 134 does not interact with the cooling fluid flowing in the primary bypass passages 132.

According to an aspect of the invention, the ratio of primary bypass passages 132 to secondary bypass passages 134 may be, for example, about 3 to 1. According to the embodiment shown, the number of primary bypass passages 132 is 18 and the number of secondary bypass passages 134 is 6.

Figure 5:
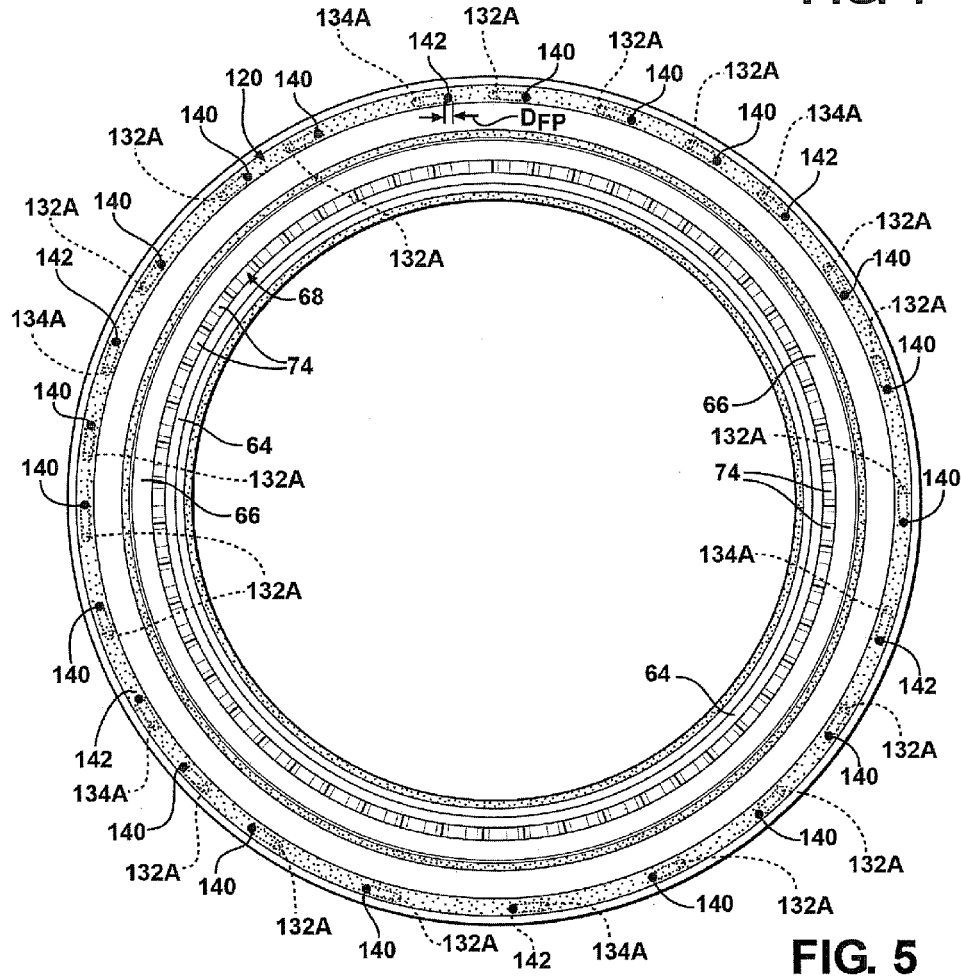
FIG. 5 is an end view of a shaft cover structure according to an embodiment of the invention shown removed from the gas turbine engine illustrated in FIG. 1.

The metering structure 120 according to the embodiment shown comprises a static, i.e., non-moving with respect to the shaft cover structure 20 since it is affixed to the shaft cover structure 20 (see FIGS. 2 and 3), ring-shaped metering member, shown in FIG. 5, which extends circumferentially about the shaft 22 and is received in a corresponding circumferentially extending slot 138 formed in the aft end portion 26 of the shaft cover structure 20, see FIGS. 2 and 3.

As shown in FIG. 5, the metering structure 120 comprises a plurality of linear first and second flow passageways 140 and 142 formed therein. The flow passageways 140 and 142 extend through the metering structure 120 and provide fluid communication between the bypass passages 32 and the turbine rim cavity 100. Specifically, the first flow passageways 140 provide fluid communication between outlets 132A of the primary bypass passages 132 (see FIGS. 2, 3, and 5) and the turbine rim cavity 100, while the second flow passageways 142 provide fluid communication between outlets 134A of the secondary bypass passages 134 (see FIGS. 2, 3, and 5) and the turbine rim cavity 100. As shown in FIG. 5, the number of first flow passageways 140 to the number of second flow passageways 142 in the embodiment shown correspond to the number of primary bypass passages 132 and secondary bypass passages 134, i.e., 18 first flow passageways 140 and 6 second flow passageways 142 are provided in the metering structure 120 in the embodiment shown. However, it is noted that extra bypass passages 32, i.e., primary and/or secondary bypass passages 132, 134, may be formed in the shaft cover structure 20 in case it is desirable to subsequently form additional flow passageways 140 and/or 142 in the metering structure 120. This may be desirable for a situation where additional cooling fluid flow into the turbine rim cavity 100 is sought. If this is the case, additional flow passageways 140 and/or 142 could be formed in the metering structure 120 at the locations of the previously blocked outlets 132A, 134A of the respective bypass passages 132, 134 to allow additional cooling fluid to flow through those bypass passages 132, 134 and corresponding flow passageways 140, 142 into the turbine rim cavity 100.

Each flow passageway 140, 142 is formed in the metering structure 120 at an angle relative to the central axis $C_A$ of the engine 10, such that cooling fluid flowing out of each flow passageway 140, 142 has a velocity component in the direction tangential to the circumferential direction. According to the preferred embodiment, each flow passageway 140, 142 is formed at an angle of at least about 70° relative to the central axis $C_A$ of the engine 10.

Further, each flow passageway 140, 142 has a diameter $D_{FP}$ (see FIG. 5) that is no larger than about half the size of a diameter $D_{BP}$ (see FIG. 2) of a corresponding one of the bypass passages 132, 134. Thus, if it is desirable to increase the amount of cooling fluid that passes through the metering structure 120 from the bypass passages 32 into the turbine rim cavity 100, the diameters $D_{FP}$ of select ones or all of the flow passageways 140, 142 can be increased to accommodate the increased flow volume. Alternatively, if it is desirable to decrease the amount of cooling fluid that passes through the metering structure 120 from the bypass passages 32 into the turbine rim cavity 100, one or more of the passageways 140, 142 could be blocked such that cooling fluid does not enter the turbine rim cavity 100 through the blocked passageways 140, 142.

Since the diameters $D_{BP}$ of the bypass passages 32 are larger than the diameters $D_{FP}$ of the flow passageways 140, 142, the bypass passages 32 can accommodate the additional flow volume without being altered. It is noted that the diameters $D_{BP}$ of the bypass passages 32 and the diameters $D_{FP}$ of the flow passageways 140, 142 are sized so as to provide a sufficient amount of cooling fluid into the turbine rim cavity 100 from the flow passageways 140, 142 to adequately cool the first blade disc structure 114 and the first lower stator support structure 118 and to reduce or prevent hot combustion gas ingestion into the turbine rim cavity 100 from the hot gas flow path HG. That is, a sufficient amount of cooling fluid is provided into the turbine rim cavity 100 to maintain the pressure within the turbine rim cavity 100 at a level wherein leakage of hot combustion gases from the hot gas flow path HG into the turbine rim cavity 100 is substantially prevented. However, in the preferred embodiment, the diameters $D_{BP}$ of the bypass passages 32 and the diameters $D_{FP}$ of the flow passageways 140, 142 are sized so as to limit the amount of cooling fluid provided to the turbine rim cavity 100; hence, maintaining the pressure within the turbine rim cavity 100 below the pressure within the annular cavity 84 and not providing more cooling fluid into the turbine rim cavity 100 than is needed. Thus, any leakage between the turbine rim cavity 100 and the annular cavity 84 through the first sealing structure 98 is from the annular cavity 84 into the turbine rim cavity 100. This is preferable, as cooling fluid leaking from the turbine rim cavity 100 into the annular cavity 84 could reduce the velocity component $V_{TC}$ of the first portion of cooling fluid flowing into the bores 86 in the first blade disc structure 114, which is undesirable.

During operation of the engine 10, compressed air from the compressor section 11 is provided to the combustion section 12 and is burned with fuel to create hot working gases as discussed above. The hot working gases from the combustion section 12 are directed into and through the transition ducts 12A and are released into the turbine section 13. The working gases flow through the hot gas path HG in the turbine section 13 where the working gases are expanded and cause the blades 14 and blade disc structures to rotate to effect rotation of the rotor 16 and the shaft 22.

Cooling fluid, e.g., compressor bleed air that may be cooled in an external cooler, enters the cooling fluid chamber 50 via the cooling fluid feed tubes 52, see FIG. 1. A first portion of the cooling fluid flows to the pre-swirl structure 30 through the pre-swirl passages 60, wherein the first portion of cooling fluid flows through the flow passage 68 of the pre-swirl structure 30.

Figure 6:
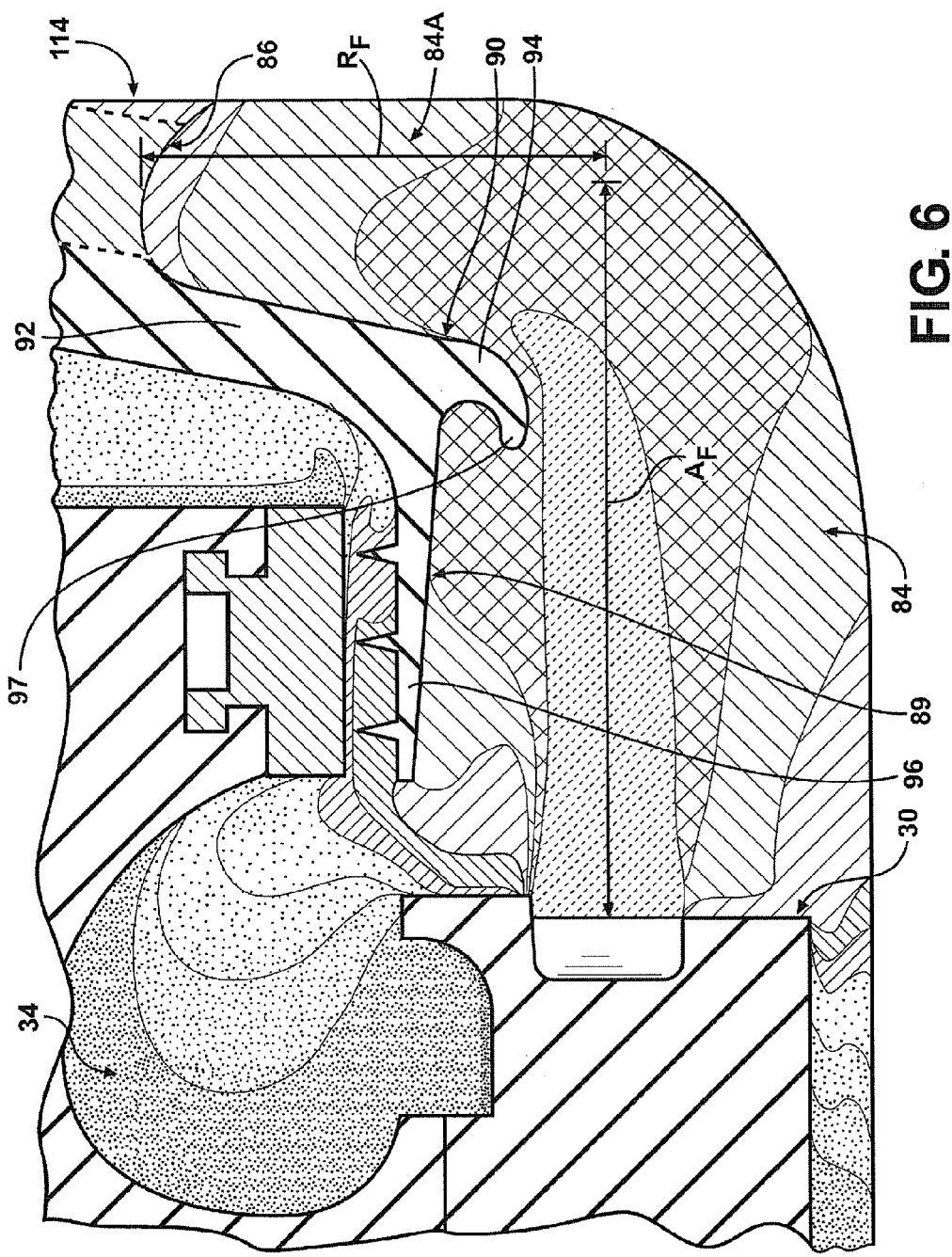
FIG. 6 is a diagram illustrating swirl ratios of cooling fluid passing out of a pre-swirl structure according to an embodiment of the invention.

As the first portion of cooling fluid passes through the flow passage 68 of the pre-swirl structure 30, the swirl members 74 provide to the cooling fluid a velocity component $V_{TC}$ in the direction tangential to the circumferential direction, as discussed above. This tangential velocity component $V_{TC}$ of the first portion of cooling fluid as the first portion of cooling fluid exits the flow passage outlet 72 is such that a swirl ratio, which is defined as the velocity component $V_{TC}$ of the cooling fluid in the direction tangential to the circumferential direction to a velocity component of the shaft 22 in the direction tangential to the circumferential direction, is greater than one. In a preferred embodiment for the engine 10 illustrated herein, as the cooling fluid passes out of the pre-swirl structure 30, the swirl ratio is preferably between about 1.15 and about 1.25. It is noted that the desired swirl ratio of the cooling fluid passing out of the pre-swirl structure 30 may vary depending on the particular engine in which the pre-swirl structure 30 is employed. For example, for some types of engines, this swirl ratio may be as high as about 3. In FIG. 6, swirl ratios of the cooling fluid at relevant sections of the engine 10 are illustrated.

The cooling fluid passing out of the pre-swirl structure 30 enters the annular cavity 84, where the first portion of cooling fluid flows circumferentially, i.e., due to passing through the pre-swirl structure 30, and also flows axially downstream toward the bores 86 formed in the first blade disc structure 114. It is noted that the downstream flow of the cooling fluid is caused by the pressure in the internal cooling circuits $14A_1$ formed in the blades 14 being lower than both the pressure of the cooling fluid in the cooling fluid chamber 50 and the pressure of the cooling fluid in the annular cavity 84.

The axial flow of the first portion of cooling fluid through the annular cavity 84 is desirable to allow for particles to flow to the radially outer portion of the annular cavity 84, such that the particles can be removed from the first portion of cooling fluid by the particle separator 89. Specifically, as the first portion of cooling fluid flows circumferentially in the annular cavity 84, solid particles, such as rust particles, sand, etc., which may be carried with the first portion of cooling fluid, flow radially outwardly to the radially outer portion of the annular cavity 84. This radially outer flow of the solid particles is caused by centrifugal forces that act on the particles, which have more mass and therefore more momentum than the cooling fluid with which the particles are flowing.

Since the solid particles are caused to flow to the radially outer portion of the annular cavity 84, some of the particles flow directly into the particle collection chamber 34. Other particles flow axially through the annular cavity 84 and contact the radially inwardly extending portion 94 of the particle deflecting structure 90. Upon contacting the radially inwardly extending portion 94 of the particle deflecting structure 90, the particles are deflected thereby and flow axially upstream along the slight radial slope of the axially extending portion 96 of the particle deflecting structure 90 toward the particle collection chamber 34. It is noted that the tendency for the particles to flow upstream may be caused, at least in part, by the slight radial slope of the axially extending portion 96 and the centrifugal forces acting on the particles that cause the particles to flow radially outwardly, i.e., caused by their mass.

The majority of the solid particles deflected by the particle deflecting structure 90 are collected in the particle collection chamber 34, where they can be removed therefrom, for example, during maintenance of the engine 10. However, it is noted that a small amount of the particles may flow through the first sealing structure 98 into the turbine rim cavity 100. It is believed that these particles may eventually pass into the hot gas flow path HG, where they may be burned off by the hot combustion gases or carried along the hot gas path HG with the combustion gases. It is also noted that some small particles may not have enough mass to flow to the radially outer portion of the annular cavity 84. These small particles may flow with the cooling fluid into the bores 86 in the first blade disc structure 114. However, most of the larger particles are believed to be separated and removed from the cooling fluid by the particle separator 89.

It is noted that an axial flow distance $A_F$ (see FIG. 6) of the first portion of cooling fluid within the annular cavity 84 in the engine 10 illustrated herein is greater than a radial flow distance $R_F$ (see FIG. 6) of the first portion of cooling fluid within the annular cavity 84 as the first portion of cooling fluid flows from the flow passage outlet 72 to the bores 86 formed in the first blade disc structure 114. In the engine 10 illustrated herein, the radial flow distance $R_F$ of the first portion of cooling fluid within the annular cavity 84 is about ⅔ of the axial flow distance $A_F$ of the first portion of cooling fluid within the annular cavity 84, e.g., the axial flow distance $A_F$ may be about 97 mm, and the radial flow distance $R_F$ may be about 62 mm. According to one embodiment, the axial flow distance $A_F$ may be at least about 50 mm, which distance is believed to allow for most of the solid particles to be removed from the first portion of the cooling fluid by the particle separator 89. Specifically, since the particle deflecting structure 90 is located axially close to the bores 86, the first portion of cooling fluid swirls a sufficient amount in the annular cavity 84 to cause the majority of the solid particles to move to the radially outer portion of the annular cavity 84, such that the particles can be separated from the first portion of the cooling fluid by the particle separator 89, as discussed above. According to another embodiment, the axial flow distance $A_F$ may be at least about 75 mm, such that more of the particles can be removed from the first portion of cooling fluid.

As shown in FIG. 6, once the first portion of cooling fluid traverses the axial flow distance $A_F$ of the annular cavity 84 and solid particles are removed by the particle separator 89, the cooling fluid flows into a free vortex portion 84A of the annular cavity 84, where the cooling fluid flows radially outwardly in the free vortex portion 84A towards the bores 86 in the first blade disc structure 114. As the first portion of cooling fluid flows radially outwardly into the bores 86, the velocity component $V_{TC}$ of the cooling fluid in the direction tangential to the circumferential direction decreases, due to a free vortex or inviscid behavior, such that the velocity component $V_{TC}$ of the cooling fluid preferably becomes approximately equal to that of the shaft 22 and the rotor 16. That is, the swirl ratio just before the cooling fluid enters the bores 86 is about 1 (see FIG. 6). This reduction in the velocity component $V_{TC}$ is caused by free vortex behavior as a result of the angular momentum of the first portion of cooling fluid dominating the angular momentum of the rotor drag in a near inviscid fashion. In this area, i.e., in the free vortex portion 84A of the annular cavity 84, angular momentum of the rotor 16 is constant.

The velocity component $V_{TC}$ decrease of the first portion of cooling fluid causes a corresponding static pressure increase of the cooling fluid, which is obtained free of any transfer or work, i.e., of the rotor 16 on the first portion of cooling fluid, and is non parasitic. The pressure of the cooling fluid is preferably increased to a pressure that is greater than the pressure of the hot combustion gases flowing through the hot gas flow path HG due to both a free vortex static pressure increase resulting from the decrease in the velocity component $V_{TC}$ and a forced vortex total pressure increase in the bores 86 resulting from the rotation of the bores 86. Hence, hot gas ingestion into the internal cooling circuits 14A$_1$ formed in the blades 14 is substantially avoided. It is noted that it may be desirable for the pressure of the cooling fluid as it enters the bores 86 in the first blade disc structure 114 to be equal to a preset value defined by the engine manufacturer for a given engine to ensure that the pressure of the cooling fluid entering the bores 86 is slightly greater than the pressure of the hot combustion gases flowing through the hot gas flow path HG.

It is noted that, since the bores 86 extend radially outwardly as the cooling fluid passes therethrough, the cooling fluid is caused to move at the same rotational speed as the first blade disc structure 114, i.e., such that the swirl ratio is equal to 1 as the cooling fluid flows within the bores 86. Since the first portion of cooling fluid and the first blade disc structure 114 include generally the same velocity component in the direction tangential to the circumferential direction just prior to the cooling fluid entering the bores 86, i.e. the swirl ration is about 1 just prior to the cooling fluid entering the bores 86, the rotor 16 is not required to increase the velocity component $V_{TC}$ of the cooling fluid up to that of the first blade disc structure 114. This is desirable, because if the velocity component $V_{TC}$ of the cooling fluid were to be increased by the rotor 16, a corresponding pressure drop and temperature increase would result from the velocity increase. The temperature increase would result in an increase in the temperature of the first portion of cooling fluid flowing into the bores 86. Such a temperature increase is undesirable, as it would adversely affect cooling of the blades 14 and the other structure to be cooled within the turbine section 13. Further, by decreasing or avoiding the pressure drop of the first portion of cooling fluid as it enters the bores 86, an increased pressure drop is achieved as the first portion of cooling fluid passes through the pre-swirl structure 30. Thus, a corresponding velocity component $V_{TC}$ increase of the cooling fluid, i.e., due to the pressure drop increase, is increased as the first portion of cooling fluid passes through the pre-swirl structure 30.

Additionally, since the rotor 16 is not required to increase the velocity component $V_{TC}$ of the cooling fluid up to that of the first blade disc structure 114 prior to the cooling fluid entering the bores 86, the rotor 16 is not required to expend any work that would otherwise be required to increase the velocity component $V_{TC}$ of the cooling fluid up to the same velocity component as the first blade disc structure 114 as the cooling fluid enters the bores 86. Hence, work expended to rotate the rotor/shaft is believed to be conserved, which increases the efficiency and output of the engine 10. Further, the conservation of the rotor work may result in an increase in the rotating velocity of the rotor/shaft and/or a reduction in the amount of fuel required to rotate the rotor/shaft. It is noted that some work must be done by the rotor 16 to maintain the swirl ratio at 1 as the first portion of cooling fluid flows radially outwardly in the bores 86. However, the work saved by the rotor 16 not being required to increase the velocity component $V_{TC}$ of the cooling fluid up to the same velocity component as the first blade disc structure 114 as the cooling fluid enters the bores 86 results in the benefits discussed above.

It is also noted that, this conserving of rotor work is also believed to avoid an increase in the temperature of the cooling fluid that would otherwise be associated with the rotor 16 expending the work to increase the velocity component $V_{TC}$ of the cooling fluid up to the same velocity component as the first blade disc structure 114 as the cooling fluid enters the bores 86. That is, if the rotor 16 were required to increase the velocity component $V_{TC}$ of the cooling fluid as the cooling fluid enters the bores 86, the work done by the rotor 16 would heat up the cooling fluid entering the bores 86, i.e., caused by a combination of Euler work and/or windage forces or friction forces. However, since this work of the rotor 16 to increase the velocity component $V_{TC}$ of the cooling fluid is not needed, the temperature increase of the cooling fluid associated with the work is avoided. Hence, the cooling fluid flowing into the cooling fluid chamber 50 need not be as cool as in a situation where the cooling fluid would otherwise be heated by the Euler work and/or windage forces or friction forces.

Moreover, since the majority of the solid particles in the first portion of cooling fluid are deflected by the particle deflecting structure 90 and captured in the particle collection chamber 34, particle flow into the bores 86 and into the internal cooling circuits 14A$_1$ formed in the blades 14 downstream from the bores 86 is reduced. Reducing the number of particles and the sizes of the particles that enter bores 86 and the internal cooling circuits 14A$_1$ formed in the blades 14 is believed to improve cooling to the blades 14, as particles (especially large particles) can clog or otherwise block cooling passages and/or cooling holes that deliver the cooling fluid to the blades 14 and other structure to be cooled by the cooling fluid. Since these cooling passages and/or cooling holes are not likely to be blocked by particles, i.e., since the particles are separated from the cooling fluid by the particle separator 89, these cooling passages and/or cooling holes may be designed to have smaller diameters that in prior art engines. This is because diameters of cooling passages and/or cooling holes in prior art engines are typically designed so as to tolerate particles to be conveyed therethrough along with the cooling fluid. If the cooling passages and/or cooling holes can be designed to have smaller diameters, a lesser amount of cooling air may be supplied from the cooling fluid chamber 50 while still providing adequate cooling to the components to be cooled in the turbine section 13.

A second portion of cooling fluid flows through the bypass passages 32 to the metering structure 120, which conveys the second portion of cooling fluid linearly into the turbine rim cavity 100. As discussed above, some of the second portion of cooling fluid passes to the metering structure 120 through the primary bypass passages 132, and some of the second portion of cooling fluid flows to the metering structure 120 through the secondary bypass passages 134. As noted above, the second portion of cooling fluid flowing to the metering structure 120 does not interact with the first portion of cooling fluid flowing through the pre-swirl passages 60 to the pre-swirl structure 30.

Since the flow passageways 140, 142 formed in the metering structure 120 are angled relative to horizontal, the second portion of cooling fluid flowing into the turbine rim cavity 100 from the metering structure 120 includes a velocity component in the direction tangential to the circumferential direction in the same direction as the rotor 16 and the shaft 22 rotate. Thus, the second portion of cooling fluid entering the turbine rim cavity 100 from the metering structure 120 does not slow down the rotor 16, i.e., due to windage forces, which is believed to further increase the efficiency of the engine 10.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gas turbine engine comprising:
   a supply of cooling fluid;
   a rotatable shaft;
   shaft cover structure;
   blade disc structure coupled to said shaft having at least one bore for receiving cooling fluid;
   a pre-swirl structure disposed about said shaft, said pre-swirl structure comprising:
     radially inner wall structure coupled to said shaft cover structure, said inner wall structure extending about said shaft;
     radially outer wall structure spaced from said inner wall structure, said outer wall structure coupled to said shaft cover structure and extending about said shaft, said inner and outer wall structures defining a flow passage therebetween, said flow passage including an inlet and an outlet and receiving a first portion of cooling fluid from said supply of cooling fluid; and
     a plurality of swirl members extending in said flow passage between said inner and outer wall structures, said swirl members each including a leading edge at said flow passage inlet and a trailing edge at said flow passage outlet and offset from said leading edge in the circumferential direction;
   a plurality of bypass passages associated with said shaft cover structure, said bypass passages in fluid communication with said supply of cooling fluid for supplying a second portion of cooling fluid from said supply of cooling fluid to a turbine rim cavity defined between said blade disc structure and an upstream stator support structure, said plurality of bypass passages including a first set of bypass passages and a second set of bypass passages, the first and second sets of bypass passages having inlets that are located respectively in separate chambers of the gas turbine engine and in different radial locations; and
   a static metering structure associated with an outlet of each said bypass passage, said metering structure comprising at least one flow passageway formed therein for permitting the second portion of cooling fluid in each said bypass passage to pass into the turbine rim cavity;
   wherein said supply of cooling fluid supplies the first portion of cooling fluid to said pre-swirl structure such that the cooling fluid exiting said flow passage outlet has a velocity component in a direction tangential to the circumferential direction;
   wherein a swirl ratio defined as the velocity component in the direction tangential to the circumferential direction of the first portion of cooling fluid to a velocity component of said shaft in the direction tangential to the circumferential direction is greater than one as the cooling fluid exits said flow passage outlet and the swirl ratio is about one as the first portion of cooling fluid enters said at least one bore formed in said blade disc structure; and
   wherein an annular cavity extends between said flow passage outlet and said at least one bore formed in said blade disc structure.

2. The gas turbine engine according to claim 1, wherein the swirl ratio is between about 1.15 and about 1.25 when the first portion of cooling fluid exits said pre-swirl structure.

3. The gas turbine engine according to claim 1, further comprising a particle separator including particle deflecting structure located downstream from said pre-swirl structure, said particle deflecting structure coupled to and extending radially inwardly from said blade disc structure, wherein said particle separator separates solid particles from the first portion of cooling fluid after the first portion of cooling fluid exits said pre-swirl structure.

4. The gas turbine engine according to claim 3, wherein said particle separator further comprises a particle collection chamber upstream from said particle deflecting structure, said particle collection chamber receiving the solid particles separated from the first portion of cooling fluid.

5. The gas turbine engine according to claim 3, wherein said pre-swirl structure remains stationary with said shaft cover structure and does not rotate with said shaft during operation of the gas turbine engine, and said particle deflecting structure rotates with said shaft during operation of the gas turbine engine.

6. The gas turbine engine according to claim 3, wherein said annular cavity is substantially defined by said blade disc structure, said pre-swirl structure, and said particle deflecting structure.

7. The gas turbine engine according to claim 1, further comprising sealing structure located axially between said flow passage outlet and said at least one bore formed in said blade disc structure, said sealing structure limits leakage between said annular cavity and the turbine rim cavity, which is located radially outwardly from said annular cavity.

8. The gas turbine engine according to claim 1, wherein said swirl members are configured such that the first portion of cooling fluid exiting said flow passage flows at an angle of from about 65° to about 85° relative to a central axis of the gas turbine engine.

9. The gas turbine engine according to claim 1, wherein said swirl members are arranged such that spacing between a first sidewall at said trailing edge of each said swirl member and a second sidewall of an adjacent swirl member causes a Venturi effect as the first portion of cooling fluid flows through said flow passage, the Venturi effect resulting in a pressure drop and a velocity increase of the first portion of cooling fluid flowing through said flow passage.

10. The gas turbine engine according to claim 9, wherein the Venturi effect is effected by converging sidewalls of adjacent swirl members.

11. The gas turbine engine according to claim 1, wherein the second portion of cooling fluid flowing from said supply of cooling fluid to the turbine rim cavity does not interact with the first portion of cooling fluid once the second portion of cooling fluid reaches said bypass passages.

12. The gas turbine engine according to claim 11, wherein each said flow passageway is formed in said metering structure at an angle such that the second portion of cooling fluid flowing out of each said flow passageway has a velocity component in the direction tangential to the circumferential direction.

13. The gas turbine engine according to claim 12, wherein said at least one flow passageway formed in said metering structure comprises at least one linear flow passageway such that the second portion of cooling fluid passes linearly into the turbine rim cavity.

14. A gas turbine engine comprising:
a supply of cooling fluid;
a rotatable shaft;
a non-rotatable shaft cover structure disposed about said shaft;
blade disc structure having at least one bore for receiving cooling fluid;
a pre-swirl structure disposed about said shaft, said pre-swirl structure comprising:
- radially inner wall structure coupled to said shaft cover structure and extending circumferentially about said shaft;
- radially outer wall structure spaced from said inner wall structure, said outer wall structure coupled to said shaft cover structure and extending circumferentially about said shaft, said inner and outer wall structures defining a flow passage therebetween, said flow passage including an inlet and an outlet and receiving a first portion of cooling fluid from said supply of cooling fluid; and
- a plurality of swirl members extending in said flow passage between said inner and outer wall structures, said swirl members each including a leading edge at said flow passage inlet and a trailing edge at said flow passage outlet and offset from said leading edge in the circumferential direction;

sealing structure located axially between said flow passage outlet and said at least one bore formed in said blade disc structure, said sealing structure limits leakage between said annular cavity and a turbine rim cavity located radially outwardly from said annular cavity;
a plurality of bypass passages associated with said shaft cover structure, said bypass passages in fluid communication with said supply of cooling fluid for supplying a second portion of cooling fluid from said supply of cooling fluid to the turbine rim cavity, said plurality of bypass passages including a first set of bypass passages and a second set of bypass passages, the first and second sets of bypass passages having inlets that are located respectively in separate chambers of the gas turbine engine and in different radial locations; and
a static metering structure that does not move relative to said shaft cover structure, said metering structure associated with an outlet of each said bypass passage and comprising at least one linear flow passageway formed therein per bypass passage for permitting the second portion of cooling fluid in each said bypass passage to pass linearly into the turbine rim cavity;
wherein said supply of cooling fluid supplies the first portion of cooling fluid to said pre-swirl structure such that the first portion of cooling fluid exiting said flow passage outlet has a velocity component in a direction tangential to the circumferential direction;
wherein a swirl ratio defined as the velocity component in the direction tangential to the circumferential direction of the first portion of cooling fluid to a velocity component of said shaft in the direction tangential to the circumferential direction is greater than one as the first portion of cooling fluid exits said flow passage outlet; and
wherein an annular cavity extends between said flow passage outlet and said at least one bore formed in said blade disc structure coupled to said shaft, wherein an axial flow distance of the first portion of cooling fluid within said annular cavity is at least about 50 mm.

15. The gas turbine engine according to claim 14, wherein the second portion of cooling fluid flowing from said supply of cooling fluid to the turbine rim cavity does not interact with the first portion of cooling fluid once the second portion of cooling fluid reaches said bypass passages.

16. The gas turbine engine according to claim 15, wherein a pressure within said annular cavity is greater than a pressure within the turbine rim cavity and is greater than a pressure within a cavity located between said shaft and said shaft cover structure.

17. The gas turbine engine according to claim 14, wherein each said flow passageway is formed in said metering structure at an angle such that the second portion of cooling fluid flowing out of each said flow passageway has a velocity component in the direction tangential to the circumferential direction.

18. The gas turbine engine according to claim 14, further comprising a particle separator comprising:
particle deflecting structure located downstream from said pre-swirl structure, said particle deflecting structure coupled to and extending radially inwardly from said blade disc structure, wherein said particle deflecting structure separates solid particles from the first portion of cooling fluid after the first portion of cooling fluid passes out of said pre-swirl structure; and
a particle collection chamber upstream from said particle deflecting structure, said particle collection chamber defined at least in part by a portion of said shaft cover structure and receiving the solid particles separated from the first portion of cooling fluid by said particle deflecting structure.

19. The gas turbine engine according to claim 14, wherein the swirl ratio is about one as the cooling fluid enters said at least one bore formed in said blade disc structure.

20. The gas turbine engine according to claim 14, wherein:
said swirl members are arranged such that spacing between a first sidewall at said trailing edge of each said swirl member and a second sidewall of an adjacent swirl member causes a Venturi effect as the cooling fluid flows through said flow passage, the Venturi effect resulting in a pressure drop and a velocity increase of the cooling fluid flowing through said flow passage, wherein the Venturi effect is effected by converging sidewalls of adjacent swirl members.

* * * * *